United States Patent Office

2,824,099
Patented Feb. 18, 1958

2,824,099

PROCESS OF MAKING A STARCH-COMPLEX PIGMENT AND THE PRODUCT THEREOF

William L. Craig, Westport, Conn., assignor to R. T. Vanderbilt Company, Inc., New York, N. Y., a corporation of New York No Drawing. Application September 24, 1953
Serial No. 382,193

7 Claims. (Cl. 260—233.3)

The object of my invention is to make improvements in the manufacture of starch-complex pigments and includes the pigments so produced.

In my prior United States Patent No. 2,573,677, issued November 6, 1951, I have described and claimed certain pigments which in general are manufactured by a series of steps including (1) the preparation of an aqueous solution containing a calcium chloride-starch complex, (2) the dilution with water of such aqueous solution, and (3) the admixing of the diluted solution with an aqueous solution of sodium silicate, thereby resulting in the precipitation of the pigment. The pigments thus produced are useful for a wide variety of purposes, including the compounding of rubber, in paints, in paper, and in ceramics.

In accordance with my present invention, I have discovered that novel pigments having unique and advantageous properties for certain purposes including paper manufacture can be prepared by treating with alum the pigments described and claimed in my prior patent. The treatment with alum is performed in such manner as to provide a finished reaction product which when dispersed in water provides a mixture having a pH within the range from 3.5 to 10.

The following examples set forth details concerning the manufacture of my new pigments and are to be considered as not limitative of the invention.

*Example I*

This example illustrates one method whereby my pigment can be prepared utilizing conventional paper mill equipment.

800 pounds of flake calcium chloride was first dissolved in water to form a 45 percent by weight aqueous solution. The solution was thereafter permitted to cool to 25° C. A slurry was also prepared by dispersing 30 pounds of potato starch in 30 pounds of water. This slurry was then added to the cooled calcium chloride solution and the mixture was stirred until the starch had become completely gelatinized. The mixture was then permitted to react, without agitation, for a period of 20 hours. The mixture was thereafter added to a hydropulper (a large vessel equipped for rapid agitation) and sufficient cold water was added to form a 10 percent by weight solution, based upon the amount of calcium chloride originally taken.

4700 pounds of a standard water glass silicate having a sodium oxide to silicon dioxide ratio of 1:3.25 and containing 39 percent by weight of solids (sodium oxide plus silicon dioxide) was added to a separate chest and was diluted with water to form a 10 percent by weight solution, based upon sodium silicate. This sodium silicate solution was added slowly to the mixture contained in the hydropulper, maximum agitation being maintained during the addition. After the addition of the sodium silicate solution had been completed, agitation of the precipitated mixture and sodium chloride was continued for a period of 45 minutes.

Finally, a 40 percent by weight aqueous solution of aluminum sulfate containing 100 pounds of aluminum sulfate and having a temperature of 130–140° F. was added to the mixture of calcium silicate-starch complex and sodium chloride present in the hydropulper, agitation still being continued, thus providing a pigment falling within the scope of my invention. This pigment, when dispersed in water, yielded a mixture having a pH of 9.5.

Examples II to V which follow illustrate the pilot plant scale preparation of my pigment.

*Example II*

3.15 pounds of anhydrous calcium chloride was dissolved in 3.85 pounds of water to form a 45 percent by weight solution, which was then permitted to cool to room temperature. A slurry was also prepared by dispersing 0.15 pound of potato starch in 100 ml. of water at a temperature of 120° F. This slurry was then added to the cooled calcium chloride solution. The mixture was then permitted to stand for a period of 20 hours, after which it was diluted by adding to it 25 pounds of water.

There was also prepared a mixture composed of 63 pounds of water and 22.6 pounds of standard water glass silicate having a sodium oxide to silicon dioxide ratio of 1:3.25 and containing 37.5 percent by weight of solids (sodium oxide plus silicon dioxide). This mixture was then added slowly with vigorous stirring to the aqueous solution containing the calcium chloride-starch complex prepared from the aqueous solution of calcium chloride and the aqueous starch slurry. This procedure resulted in the formation of about 10 pounds of a pigment falling within the scope of my Patent No. 2,573,677.

To the slurry containing this pigment and sodium chloride there was added 9.0 pounds of air-dry aluminum sulfate in the form of a 40 percent by weight aqueous solution, vigorous stirring being used during the addition. After the addition of the aluminum sulfate solution had been completed, the mixture had a pH of 3.6. The pigment was then separated and washed with water in amount approximating three times that present in the reaction mixture from which the pigment was precipitated. After drying the pigment and again dispersing it in water in the form of a mixture containing 10 percent by weight of solids, there was produced a slurry having a pH of 3.95.

*Example III*

The procedure used in this example was the same as that employed in Example II with the exceptions that the aluminum sulfate was added in the form of a dry powder, rather than in the form of a 40 percent by weight aqueous solution, and also in that the aluminum sulfate was used in the amount of 6.5 pounds. The reaction mixture in which the pigment was prepared by the reaction between the aluminum sulfate and the starch-silicate pigment had a pH of 4.5. After washing, drying and again dispersing in water in the form of a 10 percent by weight solids mixture, the mixture had a pH of 5.05.

*Example IV*

In this example, the procedure of Example III was repeated, with the exception that the amount of aluminum sulfate used was 5.62 pounds. The pH of the mixture in which the pigment was precipitated by the aluminum sulfate reaction was 6.4 before washing, and after washing the pigment and dispersing it in water to form the 10 percent by weight solids mixture such mixture had a pH of 6.58.

*Example V*

In this example, the procedure of Example III was repeated, with the exception that the amount of aluminum sulfate used was 5.0 pounds. The pH of the mixture in which the pigment was precipitated by the aluminum sulfate reaction was 8.0 before washing, and after washing the pigment and dispersing it in water to form the 10 percent by weight solids mixture such mixture had a pH of 8.42.

Various modifications can be made in the specific procedures just described to provide other pigments which fall within the scope of my invention. Such pigments are prepared by using as a starting material those described in my Patent No. 2,573,677. In general, the pigments of my patent are prepared by first reacting calcium chloride and starch in an aqueous mixture maintained at a temperature of from about 20 to 25° C. to form a calcium chloride-starch complex, the reaction mixture containing at least about 25 percent by weight of calcium chloride, based upon the weight of the water and calcium chloride, and containing from about 1.58 to about 15.8 percent by weight of starch, based upon the weight of the calcium chloride. The reaction mixture is then diluted with water until it contains not more than 7.2 percent by weight of combined calcium, based upon the weight of the calcium chloride and water used. The diluted mixture is then reacted with an aqueous solution of sodium silicate which contains not more than 30 percent by weight of combined sodium oxide and silicon dioxide in proportion such that the reacting mixtures contain substantially one gram atomic weight of combined calcium per three gram molecular weights of combined silicon dioxide, thereby resulting in the preparation of a pigment falling within the scope of my prior patent. The starch used can be any of a wide variety, including potato starch, corn starch, wheat starch, rice starch, and the like.

Preferably, however, in preparing a pigment falling within the scope of my prior patent and suitable for use as a starting material in preparing the pigment of my present invention, the calcium chloride-starch complex is prepared from a reaction mixture which contains at least about 35 percent by weight of calcium chloride, based upon the weight of water and calcium chloride, and which contains from about 3.15 to about 6.3 percent by weight of starch, based upon the weight of the calcium chloride. This mixture is diluted with water until it contains from about 1.8 to about 5.4 percent by weight of combined calcium, based upon the weight of the calcium chloride and water used. This diluted mixture is then reacted with an aqueous solution of sodium silicate having a molecular ratio of sodium oxide to silicon dioxide of at least about 1:3 and containing from about 5 to about 15 percent by weight of combined sodium oxide and silicon dioxide.

I claim:
1. A new composition of matter suitable for use as a pigment, said composition being a reaction product of aluminum sulfate and a precipitate formed by reacting in aqueous admixture sodium silicate and a calcium chloride-starch complex containing 1.58 to 15.8 percent by weight of starch based on the weight of the calcium chloride, said reaction product when dispersed in water to form a mixture containing 10 percent by weight of said reaction product yielding a mixture having a pH within the range 3.5 to 10.

2. A new composition of matter suitable for use as a pigment, said composition being a reaction product of aluminum sulfate and a precipitate formed by reacting in aqueous admixture a soluble silicate and a calcium halide-starch complex, said reaction product when dispersed in water to form a mixture containing 10 percent by weight of said reaction product yielding a mixture having a pH within the range 3.5 to 10.

3. The method of producing a pigment which comprises reacting in aqueous admixture, a soluble silicate and a complex formed by treating starch with a calcium halide to form a calcium silicate-starch pigment and thereafter reacting said calcium silicate-starch pigment with aluminum sulfate in solution to produce an improved pigment.

4. The method of claim 3 wherein the reaction between the calcium silicate-starch pigment and the aluminum sulfate is carried out in a zone of vigorous agitation.

5. The method of claim 3 wherein the calcium halide is calcium chloride and the complex contains 1.58 to 15.8 percent by weight of starch based on the weight of the calcium chloride.

6. A composition as defined in claim 1 in which the mixture in water has a pH within the range 3.95 to 9.5.

7. The method of producing a pigment which comprises reacting in aqueous admixture, sodium silicate and a complex formed by treating starch with calcium chloride, to form an aqueous slurry containing a calcium silicate-starch pigment and sodium chloride, and thereafter reacting said calcium silicate-starch pigment in said slurry containing said sodium chloride with aluminum sulfate in solution to produce an improved pigment.

References Cited in the file of this patent
UNITED STATES PATENTS

| | | |
|---|---|---|
| 2,573,677 | Craig | Nov. 6, 1951 |
| 2,583,548 | Craig | Jan. 29, 1952 |
| 2,599,093 | Craig | June 3, 1952 |